March 17, 1959 R. H. DIERSTEIN ET AL 2,878,301
ENCLOSURE FOR ELECTRICAL DEVICE
Filed Jan. 7, 1955
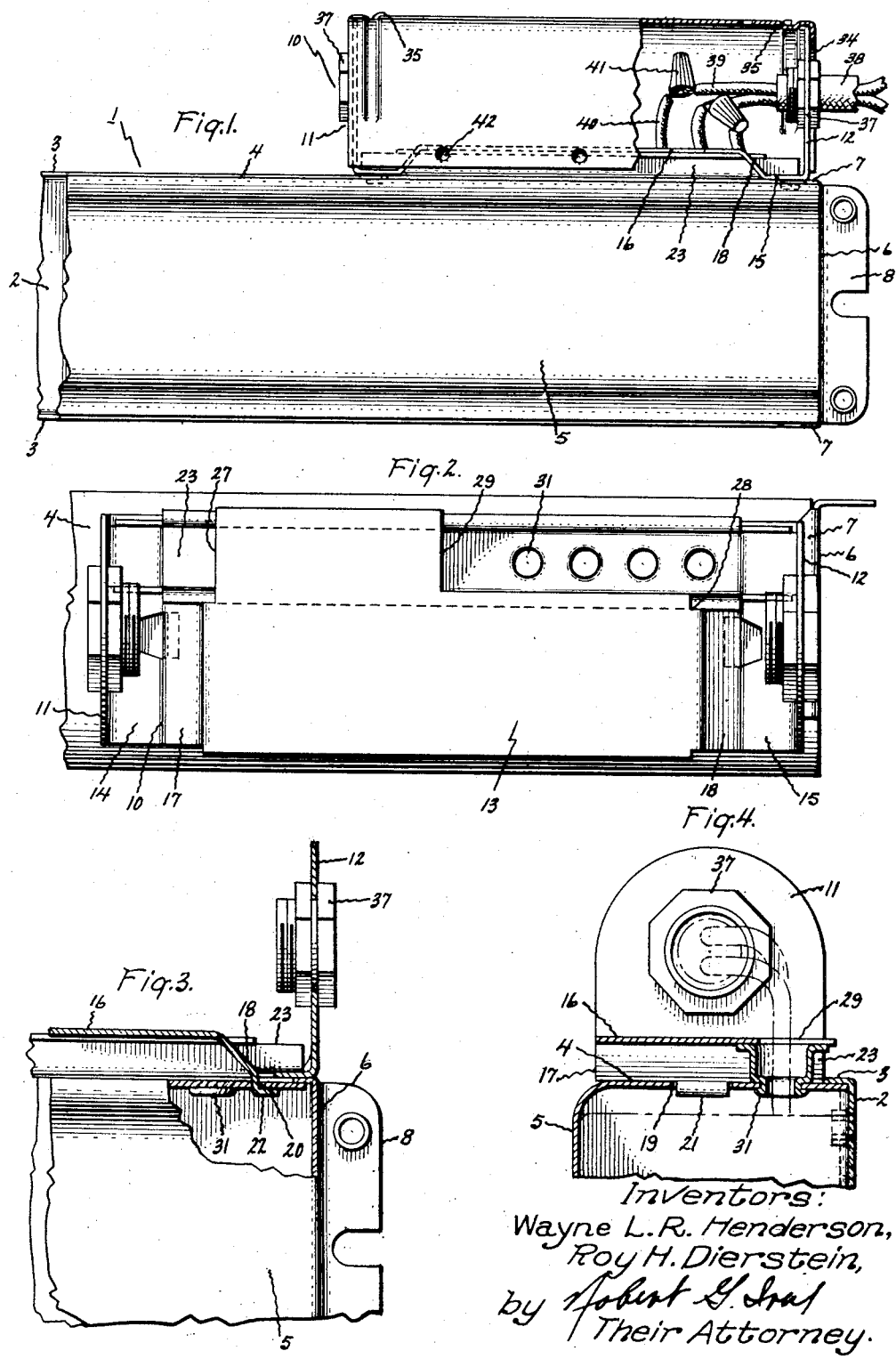
Inventors:
Wayne L. R. Henderson,
Roy H. Dierstein,
by Robert G. Ira[?]
Their Attorney.

March 17, 1959

R. H. DIERSTEIN ET AL 2,878,301

ENCLOSURE FOR ELECTRICAL DEVICE

Filed Jan. 7, 1955

Inventors:
Wayne L. R. Henderson,
Roy H. Dierstein,
by Robert G. Krul
Their Attorney.

United States Patent Office 2,878,301
Patented Mar. 17, 1959

2,878,301

ENCLOSURE FOR ELECTRICAL DEVICE

Roy Henry Dierstein, Fort Wayne, Ind., and Wayne Lee Roy Henderson, Danville, Ill., assignors to General Electric Company, a corporation of New York Application January 7, 1955, Serial No. 480,334

6 Claims. (Cl. 174—50)

This invention relates to enclosures for electrical devices and more particularly to an enclosing case having a junction box mounted thereon.

Many electrical devices such as ballast transformers for fluorescent lamps are provided with enclosing cases. The case of a fluorescent lamp ballast particularly encloses the core and coils, and a capacitor when one is provided, and is filled with an insulating compound in order to improve the transfer of heat away from the unit. The electrical leads conventionally extend out of the ballast case for connection to the fluorescent lamp or lamps being operated by the ballast and for connection to the external source of power.

Fluorescent lamps are now being used for illuminating plastic advertising signs. Since the ballasts presently available merely have the electrical leads extending therefrom, the sign manufacturer has had to supply a separate junction box for making the electrical connections between the ballast and the power lines, additional lead wire, and a channel of some type to convey the leads from the ballast to the junction box.

It is therefore desirable to provide an enclosing case for an electrical device such as a fluorescent lamp ballast, which has a junction box mounted thereon, thereby permitting the connections to the power lines to be made while eliminating the necessity for providing a separate junction box, channel, and additional lead wire. It is also desirable that this junction box be arranged to permit wiring through, i. e., bringing a cable or conduit into one side of the junction box and taking a cable or conduit out of the other side of the box leading to another junction box. It is further desirable that the box be small and so conformed as to cut off the minimum amount of light in cases where the ballast is used in plastic sign applications. It is additionally desirable that the junction box be maintained at a lower temperature than the associated ballast case. Such a junction box must of course be simple, inexpensive, and readily accessible.

It is therefore an object of this invention to provide an improved enclosure for an electrical device having the desirable features set forth above.

Further objects and advantages of this invention will become apparent and the invention will be better understood by reference to the following description and the accompanying drawing, and the features of novelty which characterize this invention will be pointed out with particularity in the claims annexed to and forming a part of this specification.

This invention in its broadest aspects provides an enclosure for an electrical device comprising a substantially rectangular case member adapted to enclose the device and having sides, top and bottom walls and end portions. A junction box member is provided secured to one of the case member walls for making electrical connections between the leads of the device and the external power leads.

In the drawing,

Fig. 1 is a side elevational view, partly broken away, showing a fluorescent lamp ballast case with the improved junction box of this invention;

Fig. 2 is a top view of the case and junction box assembly of Fig. 1;

Fig. 3 is a fragmentary side elevational view; partly in section and partly broken away further illustrating the junction box of Fig. 1 and its attachment to the ballast case;

Fig. 4 is a fragmentary end view, partly in section, further illustrating the junction box and case of Fig. 1.

Figure 5:
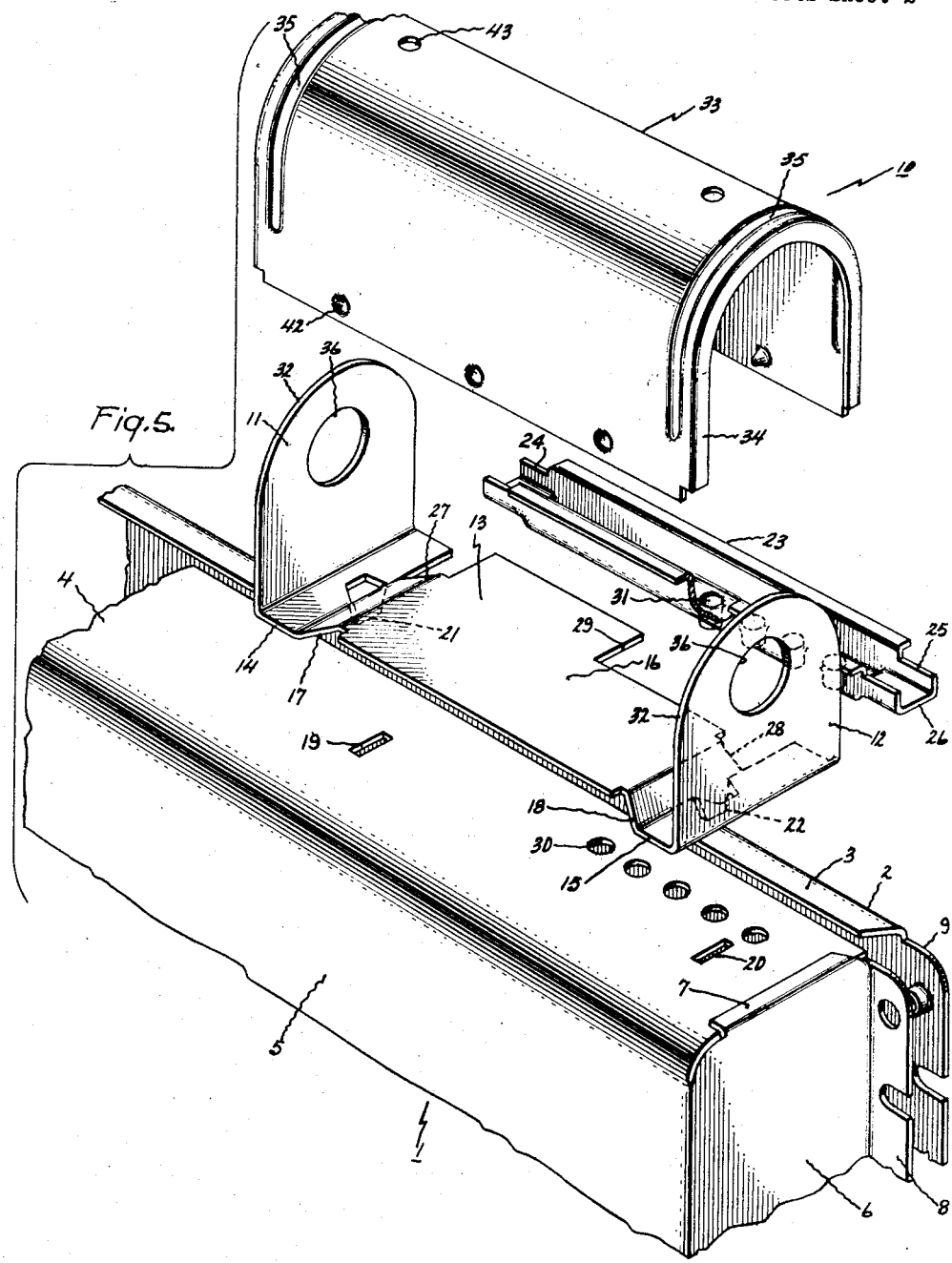
Fig. 5 is an exploded view in perspective illustrating the ballast case and junction box of this invention.

Referring now to the drawing, there is shown a case 1 for a fluorescent ballast, preferably formed of sheet metal. Case 1 is substantially rectangular in configuration and includes a cover member 2 having flanges 3 formed on the sides thereof which engage side walls 4. Side walls 4 of case member 1 are formed integral with bottom wall 5 and end walls 6 which are folded into a box shape, as shown, with flanges 7 of end wall 6 engaging side wall 4. End walls 6 and cover member 2 have extensions 8 and 9 respectively formed thereon for mounting the assembly. Case 2 is adapted to enclose the core and coils of the ballast and may also enclose a capacitor, if one is used.

In order to provide a junction box mounted on the ballast case 1, the arrangement now to be described is provided. A junction box 10 is provided, also preferably formed of sheet metal and having end portions 11 and 12 and a bottom portion 13. Bottom portion 13 has end sections 14 and 15 respectively formed integral with end portions 11 and 12 and joined to center section 16 by connecting portions 17 and 18 respectively. It will be seen that center section 16 of bottom portion 13 of junction box 10 is spaced inwardly from the end sections 14 and 15. Side wall 4 of case member 1 has a pair of spaced apart openings 19 and 20 formed therein and tabs 21 and 22 are respectively formed from end sections 14 and 15 positioned in openings 19 and 20. Tabs 21 and 22 are respectively bent over to engage the inner surface of side wall 4 thereby securing bottom portion 13 and end portions 11 and 12 of junction box 10 to side wall 4, as best seen in Fig. 3.

A channel member 23 is provided extending between the end portions 11 and 12 and disposed between center section 16 of base portion 13 and side wall 4 of case member 1. Channel member 23 is of substantially U-shaped cross-section and has the ends 24 and 25 of its web 26 secured to the upper surfaces of end sections 14 and 15 of base portion 13 in any suitable manner, as by welding. Portions 27 and 28 are cut away from connecting sections 17 and 18 respectively in order to accommodate channel member 23 and cut out portion 29 is formed in center section 16 of base portion 13 thereby exposing a portion of channel member 23. A plurality of openings 30 are formed in side wall 4 of case 1 and a plurality of grommet portions 31 are formed in web 26 of channel member 23. Grommet portions 31 register with and extend through openings 30 in side wall 4 and may be formed to engage the inner wall thereof, as best seen in Fig. 3.

End portions 11 and 12 of junction box 10 have their extremities rounded as at 32. A transversely curved cover member 33 is provided having flanges 34 respectively formed at its ends and having transversely extending grooves 35 formed therein respectively adjacent flanges 34. Cover member 33 engages end portions 11 and 12 respectively intermediate flanges 34 and grooves 35, as best seen in Fig. 1. Cover member 33 thereby forms an enclosure with end portions 11 and 12 and bottom portion 13.

End portions 11 and 12 of junction box 10 have suitable openings 36 formed therein which accommodate connectors 37 for suitable cable or conduit 38 thereby to admit external power supply leads 39 to the interior of junction box 10. Leads 40 from the device pass through openings 30 in side wall 4 of case member 1 and grommets 31 in channel member 23 to the interior of junction box 10 where they may be connected to the external power supply leads 39 in a suitable manner, as by wire nuts 41. Indentations 42 on the sides of cover member 33 engage the bottom surface of center section 16 of bottom portion 13 thereby holding cover member 33 in assembled relation and providing a snap-on construction. Openings 43 in cover members 33 drain any condensation which may form in junction box 10.

It will now be readily seen that the center section 16 of bottom portion 13 of junction box 10 is spaced from side wall 4 of case 1 thereby providing an insulating barrier of air. This air space is necessary since the permissible temperature of the ballast is higher than the permissible temperature of the junction box. Here it will be observed that the channel member 23 provides a rigid construction and furthermore, diversity of openings for the internal leads is provided since the maximum number of openings which may be desired in any particular case may be provided in side wall 4 of case 1 while only the number of grommets 31 needed for the particular design need be provided in channel member 23, the surplus openings 30 in side wall 4 thereby being covered by web 26 of channel 23. Thus, in order to provide different models with different numbers of internal leads, it is only necessary to change channels to provide the proper number of openings. In the example shown in Fig. 5, it will be seen that four grommets 31 are provided in channel 23 while five openings 30 are provided in side wall 4 and thus one of the side wall openings is blocked off by channel 23.

The provision of grooves 35 in cover member 33 makes it possible to form flanges 34. While only a single cable or conduit 38 is shown entering junction box 10, it will readily be understood that a similar cable or conduit may extend from the other end portion 11 thereby providing for a continuous run of conduit.

It will now be readily apparent that this improved construction permits the elimination of a separate junction box, connecting channel, and additional lead wires and further permits the use of a continuous run of conduit. It will also be readily seen that the construction is simple, rigid, and that the junction box is readily accessible for making the necessary electrical connections since it is completely exposed by removal of the cover member 33.

While we have shown and described a particular embodiment of this invention, further modifications and improvements will occur to those skilled in the art.

We desire that it be understood therefore that this invention is not limited to the particular form shown and we intend in the appended claims to cover all modifications which do not depart from the spirit and scope of this invention.

What we claim as new and desire to secure by Letters Patent of the United States is:

1. An enclosure for electrical apparatus of the type generating considerable heat during operation comprising a substantially rectangular case member adapted to enclose said device and having side, top, and bottom walls, and end portions, and a junction box member for making electrical connections between the leads of said device and external leads; said junction box member comprising spaced apart end portions, a bottom portion integral with said end portions and being secured adjacent its ends to one of said walls of said case member, said bottom portion being spaced from said one wall of said case member intermediate said ends, a cover member engaging said junction box end portions and having sides overlapping and engaging said bottom portion to form an enclosure with said junction box end and bottom portions, said bottom portion of said junction box member having a cut-out portion and said one wall of said case member having an opening beneath said cut-out portion for admitting the leads of said device into said junction box member, and means located between said one wall of said case member and said bottom portion of said junction box member for enclosing said leads of said device, said junction box member having means formed therein for admitting said external leads thereto.

2. An enclosure for electrical apparatus comprising a substantially rectangular case member adapted to enclose said device and having side, top, and bottom walls, and end portions, and a junction box member for making electrical connections between the leads of said device and external leads; said junction box member comprising spaced apart end portions, a bottom portion integral with said end portions and being secured adjacent its ends to one of said walls of said case member, said bottom portion having a section intermediate said ends spaced from said one wall, a channel member extending between said junction box end portions and disposed between said intermediate section of said junction box bottom portion and said one wall of said case member, and a cover member engaging said junction box end portions and forming an enclosure with said junction box end and bottom portions, said one wall of said case member and said channel member having registering openings formed therein communicating with the interior of said junction box member for admitting the leads of said device thereto, said junction box member having means formed therein for admitting said external leads thereto.

3. An enclosure for electrical apparatus comprising a substantially rectangular case member adapted to enclose said device and having side, top, and bottom walls, and end portions, and a junction box member for making electrical connections between the leads of said device and external leads; said junction box member comprising a pair of spaced apart end portions, a bottom portion integral with said end portions and being secured to one of said walls of said case member, said junction box bottom portion having a section intermediate said ends thereof spaced from said one wall of said case member, a channel member of substantially U-shaped cross-section extending between said junction box end portions and disposed between said intermediate section of said junction box bottom portion and said one wall of said case member with its web engaging said one wall, said intermediate section of said junction box bottom portion having a cut-out portion exposing a portion of said channel member, and a cover member engaging said junction box end portions and forming an enclosure with said junction box end and bottom portions, said one wall of said case member and said exposed portion of said channel member having registering openings formed therein communicating with the interior of said junction box member for admitting the leads of said device thereto, said junction box member having means formed therein, for admitting said external leads thereto.

4. An enclosure for an electrical device comprising a substantially rectangular case member adapted to enclose said device and having side, bottom and end walls, said end walls having extensions formed thereon for mounting said enclosure, a cover for said case member, and a junction box for making electrical connections between the leads of said device and external leads; said junction box comprising a pair of spaced apart end portions, a bottom portion, said bottom portion having end sections respectively formed integral with said end portions, a center section spaced inwardly from said end sections, and sections respectively connecting said center section to said end sections, one side wall of said case member having a pair of spaced apart openings formed therein, said end sections of said junction box bottom portion respectively having tabs formed thereon respectively passing through said openings in said one side wall of said case member and engaging the same thereby to secure said junction box bottom and end portions to said one side wall, a channel member extending between said junction box end portions and disposed between said one side wall of said case member and said center section of said junction box bottom portion, said channel member having its web secured to said end sections of said junction box bottom portion, said center section of said junction box bottom portion having a cut-out portion exposing a portion of said channel member, and a cover member engaging said junction box end portions and having sides overlapping and engaging said bottom portion to form an enclosure of said junction box end and bottom portions, said one side wall of said case member having an aperture formed therein, said channel member having a grommet formed in the exposed portion thereof extending through said aperture and engaging said one side wall of said case member for admitting said leads of device to the interior of said junction box, said junction box end portions having means formed therein for admitting said external leads.

5. An enclosure for an electrical device comprising a substantially rectangular case member adapted to enclose said device and having side, bottom and end walls, said end walls having extensions formed thereon for mounting said enclosure, a cover for said case member, and a junction box for making electrical connections between the leads of said device and external leads; said junction box comprising a pair of spaced apart end portions, a bottom portion, said bottom portion having end sections respectively formed integral with said end portions, a center section spaced inwardly from said end sections, and sections respectively connecting said center section to said end sections, one side wall of said case member having a pair of spaced apart openings formed therein, said end sections of said junction box bottom portion respectively having tabs formed thereon and respectively passing through said openings in said one side wall of said case member and engaging the same thereby to secure said junction box bottom and end portions to said one side wall, a channel member of substantially U-shaped cross-section extending between said junction box end portions and disposed between said one side wall of said case member and said center section of said junction box bottom portion, said channel member having its web secured to said end sections of said junction box bottom portion, said center section of said junction box portion having a cut-out portion exposing a portion of said channel member, said cover member having a flange formed on each end thereof and transversely extending grooves respectively adjacent said flanges, said cover member engaging said junction box end portions respectively intermediate said flanges and said grooves thereof forming an enclosure with said junction box and bottom portions, said one side wall of said cover member having an aperture formed therein, said exposed portion of said channel member having a grommet formed therein extending through said aperture engaging said one side wall of said cover member for admitting said leads of said device to the interior of said junction box, said junction box end portions having means formed therein for admitting said external leads.

6. A junction box member for attachment to an electrical device having a flat wall and leads extending through said wall, comprising spaced apart end portions, a bottom portion extending between said end portions and having means adjacent said end portions for mounting said junction box member on said wall, said bottom portion having a major portion indented to be spaced from said wall, a channel member extending between said end portions beneath said indented bottom portion and having openings for admitting leads from said device into said box member, and a cover member engaging said end portions and having sides overlapping and engaging said bottom portion to form an enclosure with said end and bottom portions, said junction box member having means formed therein for admitting external leads thereinto.

References Cited in the file of this patent

UNITED STATES PATENTS

| | | |
|---|---|---|
| 990,161 | Paiste | Apr. 18, 1911 |
| 1,296,653 | Griswold | Mar. 11, 1919 |
| 1,531,152 | Steen | Mar. 24, 1925 |
| 1,721,775 | Fallon | July 23, 1929 |
| 1,909,136 | Thomas | May 16, 1933 |
| 2,046,810 | Cannon | July 7, 1936 |
| 2,673,300 | Furnas et al. | Mar. 23, 1954 |
| 2,722,599 | Himes | Nov. 1, 1955 |